(12) United States Patent
Mellinger et al.

(10) Patent No.: US 10,184,780 B2
(45) Date of Patent: Jan. 22, 2019

(54) POSITION SENSOR AND ACTUATOR WITH POSITION SENSOR

(71) Applicant: SAMSON AKTIENGESELLSCHAFT, Frankfurt (DE)

(72) Inventors: Christian Mellinger, Obershausen (DE); Sven Rausch, Schoeneck (DE)

(73) Assignee: SAMSON AKTIENGESELLSCHAFT, Frankfurt (DE)

(*) Notice: Subject to any disclaimer, the term of this patent is extended or adjusted under 35 U.S.C. 154(b) by 0 days.

(21) Appl. No.: 15/810,767

(22) Filed: Nov. 13, 2017

(65) Prior Publication Data
US 2018/0135960 A1    May 17, 2018

(30) Foreign Application Priority Data
Nov. 11, 2016    (DE) .................. 10 2016 121 671

(51) Int. Cl.
*G01B 7/30*       (2006.01)
*F15B 15/28*    (2006.01)
(Continued)

(52) U.S. Cl.
CPC ............. *G01B 7/30* (2013.01); *F15B 15/28* (2013.01); *F16K 37/0033* (2013.01); *F16K 37/0041* (2013.01); *G01D 11/30* (2013.01)

(58) Field of Classification Search
CPC ....... G01B 7/30; F15B 15/28; F16K 37/0033; F16K 37/0041; G01D 11/30
(Continued)

(56) References Cited

U.S. PATENT DOCUMENTS 4,673,876 A * 6/1987 Paulsen .................. G01B 7/30
                                                          324/174
5,027,648 A * 7/1991 Filleau .................. B62D 15/02
                                                          73/117.02
(Continued)

FOREIGN PATENT DOCUMENTS

DE      3844020 A1    6/1990
DE      9000605 U1    5/1991
(Continued)

OTHER PUBLICATIONS

Office Action for German patent application 10 2016 121 671.2 dated Jul. 11, 2017.
(Continued)

*Primary Examiner* — Jermele M Hollington
*Assistant Examiner* — Sean Curtis
(74) *Attorney, Agent, or Firm* — Schiff Hardin LLP

(57) ABSTRACT

A position sensor for an actuator having a measuring shaft capable of pivoting less than, for example, 360° around a pivot axis. The position sensor can include an angle sensor to detect an actual angular position of the measuring shaft relative to a stationary reference point. The measuring shaft can include a first section extending coaxially to the pivot axis for introducing a pivotal movement to the measuring shaft corresponding to a control movement of an actuator rod, and a second section extending coaxially to the pivot axis to which a measuring shaft-based angle sub-sensor can be attached.

20 Claims, 3 Drawing Sheets

(51) Int. Cl.
*G01D 11/30* (2006.01)
*F16K 37/00* (2006.01)

(58) Field of Classification Search
USPC .................................................. 324/207.23
See application file for complete search history.

(56) References Cited

U.S. PATENT DOCUMENTS

| | | | | |
|---|---|---|---|---|
| 5,150,103 | A * | 9/1992 | Janssen-Weets | F16K 37/0041 250/231.13 |
| 5,567,874 | A * | 10/1996 | Suzuki | G01B 7/30 73/114.36 |
| 5,937,805 | A * | 8/1999 | Matsumura | F01L 1/34 123/90.15 |
| 6,556,005 | B1 * | 4/2003 | Oomkes | G01D 5/145 324/207.2 |
| 6,600,310 | B2 * | 7/2003 | Nyce | G01B 7/003 324/207.13 |
| 7,567,051 | B2 * | 7/2009 | Hori | F16H 61/32 318/432 |
| 7,752,943 | B2 * | 7/2010 | Maruyama | H02K 7/116 74/640 |
| 8,763,637 | B2 * | 7/2014 | Soldo | F16K 37/0033 116/277 |
| 8,810,237 | B2 * | 8/2014 | Muto | G01D 5/145 324/207.2 |
| 8,933,691 | B2 * | 1/2015 | Galka | G01B 7/30 324/207.2 |
| 9,086,269 | B2 * | 7/2015 | Takayanagi | B62D 15/0215 |
| 9,134,123 | B2 * | 9/2015 | Steinich | B60R 16/02 |
| 9,702,684 | B2 * | 7/2017 | Kaneko | G01D 5/145 |
| 9,791,298 | B2 * | 10/2017 | Kadoike | G01B 7/30 |
| 2003/0086470 | A1 * | 5/2003 | Nomiyama | F16K 37/0083 374/6 |
| 2005/0258823 | A1 * | 11/2005 | Kinoshita | F01L 1/34 324/207.23 |
| 2008/0001568 | A1 * | 1/2008 | Hori | F16H 61/32 318/652 |
| 2008/0098839 | A1 * | 5/2008 | Maruyama | H02K 7/116 |
| 2009/0206827 | A1 * | 8/2009 | Aimuta | G01D 5/145 324/207.25 |
| 2013/0169270 | A1 * | 7/2013 | Delbaere | G01D 5/24409 324/207.25 |
| 2013/0192079 | A1 * | 8/2013 | Steinich | B60R 16/02 33/706 |
| 2013/0342192 | A1 * | 12/2013 | Kanemitsu | G01B 7/30 324/207.17 |
| 2014/0246267 | A1 * | 9/2014 | Takayanagi | B62D 5/0457 180/446 |
| 2014/0368192 | A1 * | 12/2014 | Kaneko | G01D 5/145 324/207.25 |
| 2016/0097655 | A1 * | 4/2016 | Hernandez-Oliver | G01D 5/12 324/207.25 |
| 2016/0178396 | A1 * | 6/2016 | Kolbenschlag | G01L 5/221 324/207.21 |
| 2016/0202087 | A1 * | 7/2016 | Kadoike | G01B 7/30 324/207.12 |
| 2017/0349211 | A1 * | 12/2017 | Shiino | B62D 5/04 |
| 2018/0135960 | A1 * | 5/2018 | Mellinger | G01B 7/30 |
| 2018/0209266 | A1 * | 7/2018 | Clark | G01R 33/022 |

FOREIGN PATENT DOCUMENTS

DE 20008930 U1 7/2001
EP 2549236 A1 1/2013

OTHER PUBLICATIONS

German action dated Jul. 11, 2017 for application 10 2016 121 671.2 and English translation.

* cited by examiner

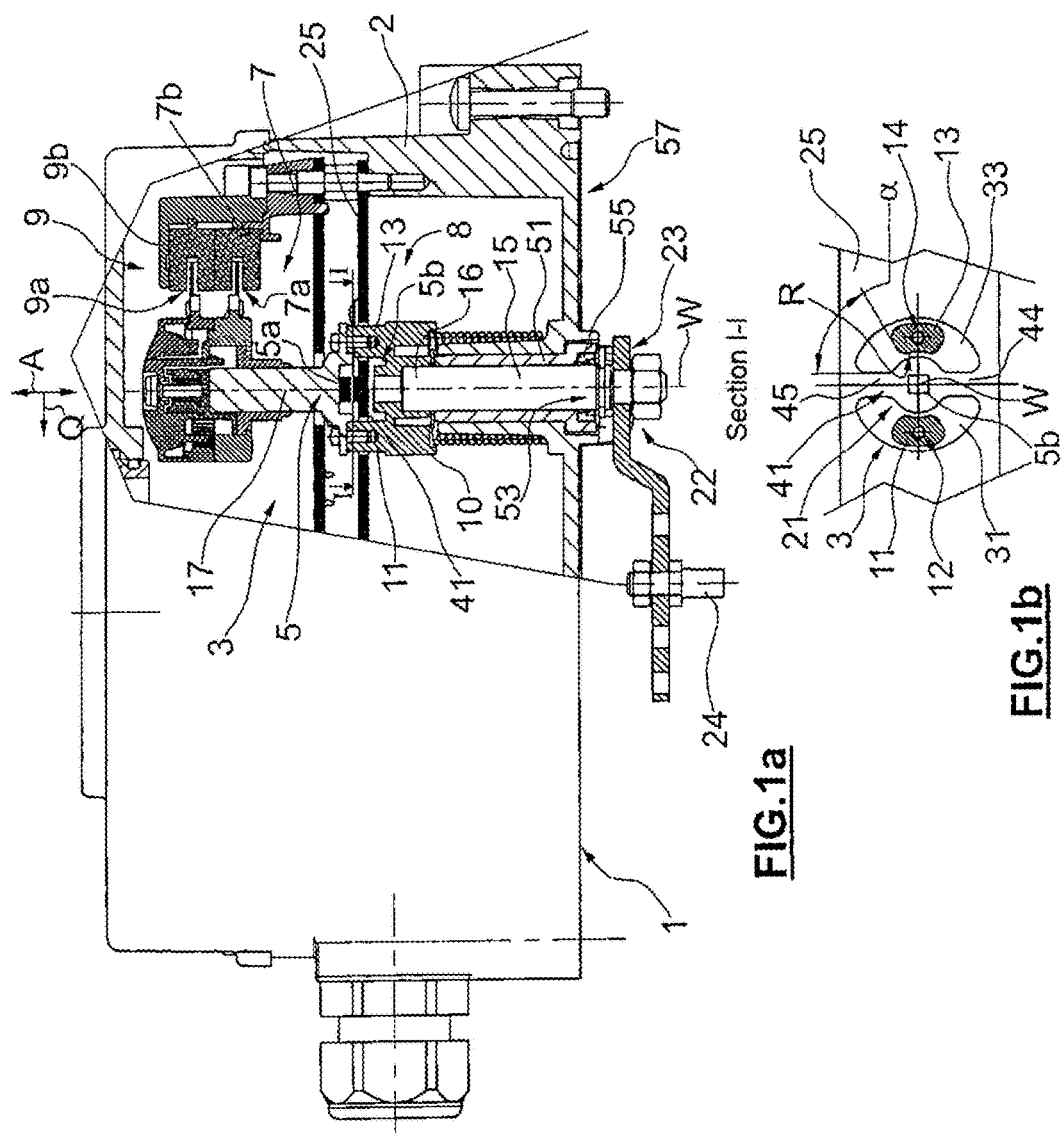
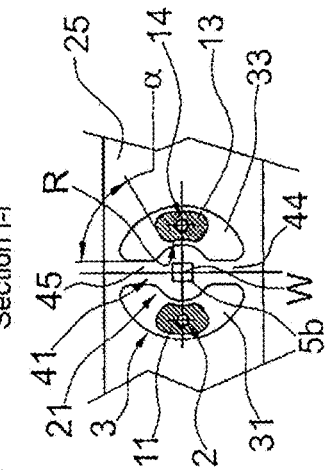
FIG.1a
FIG.1b

POSITION SENSOR AND ACTUATOR WITH POSITION SENSOR

CROSS REFERENCE TO RELATED APPLICATIONS

This patent application claims the benefit of priority of and to German Patent Application No. 102016121671.2, filed Nov. 11, 2016, which is incorporated herein by reference in its entirety.

BACKGROUND

The present disclosure is directed to a position sensor of an actuator, such as a control valve. The control valve can be of a process engineering plant, for example a chemical plant, such as a petrochemical plant, a power plant, a food processing plant such as a brewery, or the like. The present disclosure relates to an actuator with a position sensor. The actuator can be, for example, a regulator valve, a control valve or a shut-off valve, such as an emergency shut-off valve, but is not limited thereto.

A position sensor is described, for example, in German Patent Application Publication No. DE 38 44 020 A1. This position sensor can detect a rectilinear motion of a drive rod of an actuator, such as a control valve, in order to report it to a central monitoring station. According to DE 38 44 020 A1 A, linear or angular movement can be detected by way of an amplitude or resistance change as a result of a core and slider moving relative to each other, or by a Hall-effect sensor, a capacitive sensor, a rotary encoder or a rotary potentiometer. In the known system, a linear conversion of the distance into an electrical measurement variable is performed. In the specific design in accordance with DE 38 44 020 A1, the position sensor detects a linear valve-rod distance via a lever which is connected to a measuring shaft in a rotationally fixed manner, and causes a corresponding rotational movement of the measuring shaft. The shaft has a sectionally semi-circular cross-section, on the flat side of which a Hall-effect sensor is mounted, which rotates between two stationary magnetic poles fixed to the housing of the position controller. With the Hall-effect sensor, the actual angular position of the measuring shaft relative to the housing can be detected. In the position controller described in DE 38 44 020 A1, it has been found that the achievable measuring accuracy is limited due to production, assembly and mounting tolerances. With the known position sensor, the real actual angular position of the measuring shaft and the actual position of the actuator, derived therefrom, can only be determined with relatively low accuracy. It has also proved to be disadvantageous that due to the movement of the shaft, the wiring of the shaft-mounted Hall-effect sensor is subject to adverse levels of wear. This is particularly problematic for safety-critical actuators, such as emergency shut-off valves.

U.S. Patent Application Publication No. 2003/0086470 A1 describes a position sensor for an actuator, in which the control path of a valve control rod is taken via a lever and transmitted to a measuring shaft. Two magnets are arranged on the measuring shaft, which are mounted on the housing of the position sensor at a fixed position at the height of the axis of rotation of the measuring shaft. Because of the positionally fixed arrangement of the magneto-resistive sensor element, wear on the sensor cabling is avoided. However, with US 2003/0086470 A1, the position sensor production, assembly and mounting tolerances also occur, and consequently measurement errors also occur. In addition, sometimes transient or abrupt actuator movements, for example when rapidly switched off, have a detrimental effect on the magnetization of the permanent magnets. Therefore, for detecting an actual angular position for safety-critical actuators, such as emergency shut-off valves, the position sensor in accordance with US 2003/0086470 A1 has only limited suitability.

A further position sensor is described from German Patent Utility Model No. DE 200 08 930 U1, in which a measuring shaft can sense a linear motion of an actuator with a control valve via a lever. A permanent magnet is attached to the end face of the measuring shaft, the rotational movement of which is detected by a GMR sensor fixed to the housing. As a result of assembly tolerances, manufacturing tolerances and/or mounting tolerances of the measuring shaft, measurement errors can also occur with this sensor. The position sensor known from DE 200 08 930 U1 is therefore also rather unsuitable for safety-critical applications of actuators, such as emergency shut-off valves.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1a shows a position sensor with a multi-part measuring shaft according to an exemplary embodiment of the present disclosure;

FIG. 1b shows a cross-sectional view along the section line I-I in accordance with FIG. 1a;

The exemplary embodiments of the present disclosure will be described with reference to the accompanying drawings. In the drawings, the same or similar components are referenced with the same or similar reference numerals.

DETAILED DESCRIPTION

Figure 1C:
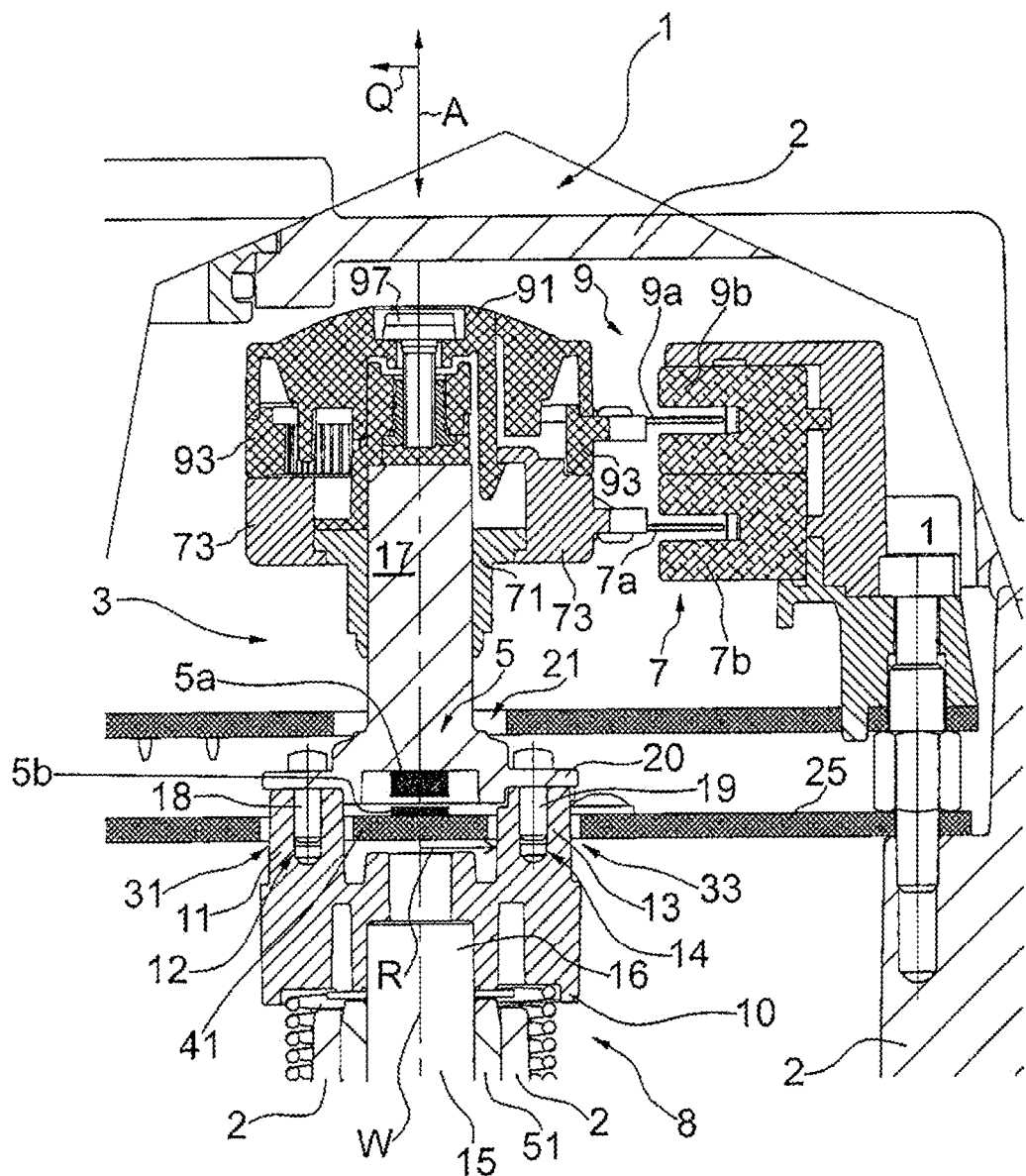
FIG. 1c shows a more detailed view of the position sensor of FIG. 1a, including showing the angle sensor and the position detector according to an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to overcome the disadvantages of the prior art, including to provide a position sensor configured for actuators for safety-critical applications such as emergency shut-off valves, and/or configured to provide precise detection of angular positions, including critical angular positions, with high accuracy.

The present disclosure describes a position sensor for an actuator, such as a control valve, of a process engineering plant (e.g. a chemical plant, a power plant or the like). In an exemplary embodiment of the present disclosure, the position sensor can include a measuring shaft configured to pivot by less than 360° about a pivot axis, and an angle sensor configured to detect an actual angular position of the measuring shaft relative to a stationary reference point. In an exemplary embodiment, the position sensor can have a housing, where the stationary reference point can be realized as a fixed reference point on the housing. The stationary reference point can be a point of reference that is defined by the housing of the position sensor or by a part attached thereto, but is not limited thereto. In an exemplary embodiment, the measuring shaft can be configured to be connected to a drive bar or drive shaft of the actuator (e.g. with a form and/or force fit) to execute a measuring shaft movement corresponding to the movements of the actuator drive rod or shaft. The actuator can be configured to operate or drive a control member, such as a valve member, in a rotary and/or translational manner. In an exemplary embodiment, the actuator includes an emergency shut-off function, such as an emergency closure valve or emergency opening valve. In an exemplary embodiment, for a smaller measuring range and/or a higher measurement resolution, the pivot axis can be pivotable by less than, for example, 270°, less than 180°, or less than 135°, about the pivot axis, but is not limited thereto. It should be clear that the pivot axis corresponds to the axis of rotation of the measuring shaft and that the measuring shaft, at least in some sections, is concentric and coaxial to the pivot axis.

In an exemplary embodiment, the position sensor can include an angle sensor. The angle sensor can be a magnetoresistive sensor, but is not limited thereto. For example, the magnetoresistive angle sensor can be, for example, an anisotropic magnetoresistance (AMR) sensor or a giant magnetoresistance (GMR) sensor. Other sensor types, for example, a Hall-effect sensor, are also possible. Further, the angle sensor is not limited to magnetoresistive technologies, and the angle sensor can implement another technology (e.g. optical sensor). In an exemplary embodiment, the angle sensor is configured to capture an actual angular position of the measuring shaft within its measuring range to control the position controller. In an exemplary embodiment, a position sensor and/or position controller electronics receives an actual angular position value (from the position sensor). The received value can then be compared against a target angular position value to control the position. In an exemplary embodiment, the angle sensor can be configured to detect the actual angular position of the measuring shaft continuously (or essentially continuously), for example, using an analogue measurement. In an exemplary embodiment, the angle sensor is configured to detect at least five, at least ten, at least 100 or at least 1000 different angular positions so as to carry out a precise control or regulation of the actuator based on the actual angular position measurement data of the angle/position sensor. In an exemplary embodiment, the angle sensor (e.g. theoretically, in the new condition before being installed into a position sensor according to the present disclosure) can provide a measuring accuracy of ±10° or better, ±5° or better, ±2° or better, ±1° or better, or ±0.5° or better so as to provide a measurement range of up to 90°, up to 180°, or up to 360°.

In an exemplary embodiment, the measuring shaft of the position sensor has a first measuring shaft section, which extends coaxially to the pivot axis in the axial direction, over a distance that is at least twice that of the (e.g. mean and/or smallest) measuring shaft diameter of the first measuring shaft section. The first measuring shaft section can be configured to initiate a rotary motion of the measuring shaft corresponding to a control movement of the actuator rod or shaft. In an exemplary embodiment, the first measuring shaft section can include a coupling section in order to receive the rotary movement directly from a control shaft or indirectly from a control shaft or rod. The first measuring shaft section can be, for example, a fully cylindrical section of the measuring shaft, which is mounted and movable relative to the housing inside a ball bearing or sliding bearing. The first section of the measuring shaft (or: first measuring shaft section) can be designated as a bearing section. In an exemplary embodiment, sliding bearings are used due to their lower bearing tolerance. In an exemplary embodiment, the first measuring shaft section is implemented as a massive cylindrical body.

In an exemplary embodiment, the measuring shaft of the position sensor further includes a second section of the measuring shaft (or: second measuring shaft section). The second measuring shaft section can be coaxial to the pivot axis, which extends in the axial direction. Further, a measuring shaft-based angle sensor component, such as a permanent magnet, of the angle sensor is attached to the second (coaxial) section of the measuring shaft. The second section of the measuring shaft can be, for example, a massive fully cylindrical section of the measuring shaft, which is mounted and movable relative to the housing inside a ball bearing or sliding bearing. The measuring shaft-based angle sensor component (i.e. the component of the angle sensor being rotationally fixed to the measuring shaft) can be arranged on the measuring shaft rotationally fixed relative to the measuring shaft. In an exemplary embodiment, an angle sensor can include at least two angle sub-sensors, one (e.g. sensing sub-sensor) of which is stationary (e.g. fixed to the housing at the reference point), and the other (sensed sub-sensor, such as permanent magnet) is measuring shaft-based. The arrangement of the sub-sensors is not limited to this arrangement and the sub-sensors can be in a reversed arrangement, such as the sensing sub-sensor being arranged on the measuring shaft while the sensed sub-sensor is stationary (e.g. fixed to the housing). The sensing sub-sensor can be configured to sense or otherwise detect the sensed sub-sensor (e.g. that can include a permanent magnet). In an exemplary embodiment, one or more of the angle sub-sensors include processor circuitry that is configured to perform one or more functions of the respective angle sub-sensor.

In these arrangements, the relative motion of the measuring shaft with respect to the reference point is accompanied by a relative motion of the two angle sensor components relative to each other. In operation, the angle sensor detects this relative movement to determine the actual angular position of the measuring shaft relative to the reference point (e.g. the housing). With a measuring shaft of the position sensor according to one or more aspects, assembly-related tolerances can be reduced and/or avoided. Further, manufacturing- and mounting-related tolerances are largely eliminated due to the second measuring shaft section and the mounting of the measuring shaft-based angle sensor component thereon according to one or more embodiments. In this way, with the position sensor according to the present disclosure, it is possible to achieve a significantly improved accuracy of the angle measurement. For example, when using, for example, an AMR sensor, the embodiments also ensure that the control of an assembled target distance between the magnetic field sensor and the magnet is particularly easy to implement. Surprisingly, with embodiments according to the present disclosure, the installation of the measuring shaft in the position sensor is also particularly easy because even greater tolerances related to the shaft assembly can be readily compensated for by a suitable installation of the measuring shaft-based angle sensor component on the second measuring shaft section. A central (or substantially central) arrangement of the AMR sensor on the pivot axis can also be realized in the various embodiments of the present disclosure. Embodiments are not limited to AMR sensors and can be implemented using other types of sensors as would be understood by one of ordinary skill in the art.

In an exemplary embodiment of the present disclosure, the measuring shaft includes at least one bar extending eccentrically to the pivot axis in the axial direction. The one or more bars can be arranged in the axial direction between the first section of the measuring shaft and the second section of the measuring shaft to connect the measuring shaft sections in a rotationally fixed manner. In an exemplary embodiment, the at least one bar can be connected to the first measuring shaft section either close to or on the end face thereof. This connection can be nearest to the actuator coupling in the axial direction. The at least one bar can be connected to the second measuring shaft section either close to (in the axial direction) the base end thereof or directly to the base end thereof. This connection can be furthest from the actuator coupling. For example, the measuring shaft can have exactly one, exactly two or exactly three eccentric bars. In an exemplary embodiment, the measuring shaft has less than ten, less than five, or less than four eccentric bars joined to the first measuring shaft section, but is not limited thereto. The plurality of bars can be distributed in the circumferential direction, in particular at equal angular intervals. The cross-section of the eccentric bar or bars is dimensioned and arranged such that the entire cross section of the eccentric bar is eccentric relative to the pivot axis, in particular non-contacting in every angular position of the measuring shaft relative to the pivot axis. The at least one eccentric bar, or plurality of eccentric bars, can define a minimum bar distance relative to the pivot axis of the measuring shaft in a radial direction perpendicular to the pivot axis of at least 2 mm, at least 4 mm, or at least 6 mm, but is not limited thereto. In particular, the eccentric bars are designed relative to the pivot axis along the entire angular path or the measurement path of the pivotable measuring shaft such that they can move concentrically about the pivot axis in a non-contacting manner relative to the pivot axis. In an exemplary embodiment the bar extends over its entire length substantially parallel and transversely to the axial direction of the measuring shaft.

With a position sensor according to an exemplary embodiment of the present disclosure, the measuring shaft includes a free space (e.g. a cylindrical free space) which is arranged between the sections of the measuring shaft (the first measuring shaft section and the second measuring shaft section) in an axial direction, and at the level of the pivot axis in a radial direction. In an exemplary embodiment, the angle sensor (e.g. one of the sub-sensors) is positioned at least partially in this free space. The at least one eccentric bar thereby allows access to the free space in a radial direction perpendicular to the axial direction. The number and size of the eccentric bars in the circumferential direction in relation to the shape, in particular the circumferential extension of the opening(s) about the pivoting axis, enable the maximum pivot range of the measuring shaft to be defined. In an exemplary embodiment, the measuring shaft leaves a free space (e.g. cylindrical free space) in the radial direction perpendicular to the pivot axis at the level of the pivot axis, over the radial extension of the fully cylindrical first and/or second section of the measuring shaft, in which space the angle sensor is arranged. The at least partially rotation-body-shaped, in particular cylindrical, free space can begin in an axial direction from the end face of the first measuring shaft section. The free space (cylindrical in the radial direction) can extend over the full extent from and including the pivot axis in the radial direction to the at least one eccentric bar. In an exemplary embodiment, the cylindrical free space can be bounded radially by an envelope curve, which is defined by a rotation of the at least one eccentric bar about the pivot axis. In an exemplary embodiment, the free space has an at least sectionally rotational shape, wherein depending on the measuring range or the pivot range of the measuring shaft, the rotationally body-shaped free space section needs to extend primarily in the circumferential direction over the measuring range or pivot range of the pivotable measuring shaft.

In an exemplary embodiment, the position sensor includes a sensor carrier, such as a circuit board, to which an angle sub-sensor of the angle sensor is attached (e.g. being stationary relative to the housing of the position sensor). This angle sub-sensor implements a fixed reference point for the angle sensor. In an exemplary embodiment, the sensor carrier extends transversely to the pivot axis and protrudes into the free space in a radial direction. Alternatively or additionally, the sensor carrier (e.g. sensor circuit board), includes at least one sickle-shaped or U-shaped opening through which the at least one eccentric bar protrudes in the axial direction. The shape of the opening is not limited hereto. In an exemplary embodiment, the sickle-shaped opening surrounds the pivot axis in the circumferential direction by less than 180°. In an exemplary embodiment, the U-shaped opening surrounds the pivot axis in the circumferential direction over at least 180°, but less than 360°. In an exemplary embodiment, the number of openings of the sensor carrier which protrudes through the at least one eccentric bar is less than or equal to the number of eccentrically extending bars.

In an exemplary embodiment, the sensor carrier (e.g. sensor circuit board) includes a bridge or a tongue, which is at least partially confined by the at least one opening, wherein the bridge or tongue carries the stationary angle sub-sensor (e.g. housing-based) arranged on the pivot axis of the measuring shaft. With this arrangement, it is possible for both the stationary angle sub-sensor as well as the measuring shaft-based angle sub-sensor to be arranged at the radial level of the pivot axis, particularly being intersected by the pivot axis, allowing a particularly high measurement accuracy to be obtained. In an exemplary embodiment, the stationary and/or measuring shaft-based angle sub-sensor realizes a rotationally asymmetrical measurement reference, such as a rotationally asymmetrical magnetic field. When using permanent magnets, for example, as one component of the angle sensor (e.g. one of the sub-sensors includes a permanent magnet), an arrangement of the pole exactly on the pivot axis could cause a rotationally symmetrical magnetic field to be formed, the rotational motion of which cannot be detected by a sensor, or at least not easily. In an exemplary embodiment, the sensor carrier which has a tongue carries the stationary (housing-based) angle sub-sensor on a peninsula-like projection extending into an opening, which can also be referred to as a nose. In the case of a sensor carrier with a bridge, at least two openings which laterally confine the bridge can be provided. In this example, the openings can be sickle-shaped and surrounded on the outer side by the sensor carrier so that the bridge supporting the stationary angle sub-sensor is fixed relative to a stationary reference, or to the housing of the position sensor relative to the pivot axis, in bridge ends that are opposite one another in the radial direction, or at least offset in the circumferential direction by more than 90°. The sensor carrier with a bridge can allow a particularly stable mounting of the stationary angle sub-sensor. In comparison to a bridge, a tongue allows a larger opening in the circumferential direction through which at least one eccentric bar can protrude, so that a larger installation and/or measurement range is available. It should be clear that a sensor carrier with a bridge can also be designed in such a way that a particularly star-shaped bridge has more than two, for example three, four, or more, bridge feet, which can merge integrally into the surrounding material of the sensor carrier or which can be attached thereto.

In an exemplary embodiment, the position sensor has a measuring range for the actual angular position of (1) at least 30°, at least 60°, or at least 80°, and/or (2) less than 360°, less than 270°, less than 180°, less than 120°, or less than 90°.

In an exemplary embodiment, the position sensor includes position detector/indicator. The position detector/indicator can include a measuring shaft-based position sub-detector/indicator arranged on the measuring shaft, and configured to detect whether the actual angular position of the measuring shaft corresponds to a predetermined angular position and provide a corresponding indication (e.g. indicator signal) based on the detection. This arrangement can be on, for example, the second section of the measuring shaft. This section can be coaxial in one or more embodiments, but is not limited thereto. In an exemplary embodiment, the position detector/indicator is a switch, such as an end stop sensor, and/or the position detector is implemented optically, inductively, capacitively, and/or mechanically, or other implementations as would be understood by one of ordinary skill in the art. In an exemplary embodiment, the position detector is configured to generate a position detection signal for the position sensor and/or a position controller. The signal can be digital, but is not limited thereto and can be analog. The signal can indicate either that the actual angular position of the measuring shaft corresponds to a predetermined angular position or that the actual angular position does not correspond to the predetermined angular position. That is, the position sensor has both the facility to determine an actual angular position of the measuring shaft within a relatively wide actual angular position measuring range, in particular with a predetermined resolution as described above, and additionally includes a position detector which can detect in particular safety-critical angular positions unambiguously and with a very small measurement error.

In an exemplary embodiment, the first coaxial measuring shaft section and the eccentric bar (and the second measuring shaft section in one or more embodiments), which are coaxial to the pivot shaft axis, can be implemented as an integral component. In another exemplary embodiment, the first coaxial measuring shaft section, the second in particular coaxial measuring shaft section and/or the at least one eccentric bar are formed by a plurality of detachably connected separate parts.

In an exemplary embodiment, a position sensor for an actuator (e.g. a control valve) of a process engineering plant (e.g. a chemical plant, a power plant or the like) can include a measuring shaft which can be pivoted about a pivot axis by less than 360°.

In an exemplary embodiment, the position sensor includes an angle sensor configured to detect an angular position (e.g. actual angular position) of the measuring shaft relative to a reference point (e.g. to a housing of the position sensor). The angle sensor can include an angle sub-sensor, such as or having a permanent magnet, being rotationally fixed relative to the measuring shaft, and a stationary angle sub-sensor component, such as an AMR-sensor, being stationary relative to the reference point (e.g. housing). In an exemplary embodiment, the position sensor further includes at least one position detector/indicator configured to detect and/or indicate whether the actual angular position of the measuring shaft corresponds to a predetermined angular position. In an exemplary embodiment, the position detector/indicator includes a position sub-detector rotationally fixed relative to the measuring shaft, such as a switch flag. The fixed position sub-detector can be eccentrically arranged relative to the pivot axis. The position detector also can include a stationary position sub-detector that is stationary relative to the reference point (e.g. the housing). The stationary position sub-detector can be, for example, a switch. The arrangement of the position sub-detectors is not limited and the arrangements of the particular sub-detectors can be reversed. For example, the switch flag can be configured as the stationary sub-detector relative to the reference point while the switch is configured as the fixed position sub-detector arranged relative to the pivot axis.

In an exemplary embodiment, the angle sensor (e.g. one of the angle sub-sensors) is arranged on the axis of rotation of the measuring shaft. By the combined use of both an angle sensor and a position detector in a single position sensor, it is possible in a simple manner to ensure an accurate measurement of the angular position along the measuring path and especially with respect to at least one predetermined critical position. In particular, the at least one position detector provided in addition to the angle sensor allows a reliable and accurate detection of critical control positions, so that the angle sensor itself does not need to be designed particularly reliably and thus expensively for this purpose. Any manufacturing tolerances, assembly tolerances and/or mounting tolerances in a position sensor in accordance with this aspect of the present disclosure can be taken into account when calibrating the position sensor for adjusting the at least one position detector.

In an exemplary embodiment, the measuring shaft comprises a first section of the measuring shaft, such as a bearing section, extending coaxially to the pivot axis in an axial direction, and at least one bar connected to the first section of the measuring shaft and extending eccentrically to the pivot axis in an axial direction. As part of this arrangement, the measuring shaft can, at the level of the pivot axis in a radial direction, leave a free space, such as cylindrical free space, in which the angle sensor may at least partially be arranged at the level of the at least one bar in an axial direction. To this end, the bar is designed to allow a radial access to this free space from the outside.

In one or more exemplary embodiments where the measuring shaft includes a coupling section configured to introduce a pivotal movement around the pivot axis of the measuring shaft corresponding to a linear or rotational control movement of an actuator bar or shaft of the actuator, the measuring shaft-based angle sub-sensor is arranged between the coupling section and the at least one position detector or indicator in the axial direction. Using such an arrangement can ensure that the actual angular position measurement cannot distort the measurement of the angular position due to a possible torque produced by the position detector on contact with, for example, a switch flag.

The present disclosure also relates to an actuator such as a control valve, in particular an emergency shutoff valve, configured to control a process fluid flow of a processing plant (e.g. a chemical plant, a power plant or the like) having a position sensor according to aspects of the present disclosure. In an exemplary embodiment, the position sensor is configured such that the measuring shaft performs a pivotal movement in accordance with or corresponding to a control movement of an actuator bar or shaft of the actuator.

In an exemplary embodiment, the position sensor includes a position detector that is configured to detect a predetermined angular position of the measuring shaft, which corresponds to an end position of the actuator bar or shaft, including completely opening and (in the case of at least two position detectors)/or completely closing the actuator.

In the drawings, the position sensor according to the various embodiments is labelled with the reference numeral 1 and its measuring shaft with the reference numeral 3. The angle sensor is generally labelled with the reference number 5 and the position detector or detectors with the reference numerals 7 and 9.

The position sensor 1 shown in FIGS. 1*a*, 1*b* and 1*c* has a measuring shaft 3, which is assembled from a plurality of separate components.

The embodiments of the position sensors 1 shown in the following Figures belong to the type of position sensors for actuators such as control valves (e.g. emergency shutoff valves) in which a control valve is actuated by an actuator drive, for example a pneumatic or electric actuator, via a linearly displaceable actuator rod. The position sensors 1 are not limited to implementations with control valves as would be understood by one of ordinary skill in the art. In an exemplary embodiment, a lever 23 is arranged on the measuring shaft 3 in a rotationally fixed manner (i.e. is measuring shaft-based) and so forms a coupling section 22 at the base of the first section 15 of measuring shaft to detect the actual position of the control valve relative to a control valve seat or the like. In an exemplary embodiment, the lever 23 can be pivotably hinged to the linearly displaceable actuator rod of the actuator. The linear actuator motion of the actuator rod of the actuator is converted via the lever 23 into a rotary motion of the measuring shaft 3 about its rotational axis W. On the measuring shaft 3, a measuring shaft-based angle sub-sensor 5*a* of the angle sensor 5 is arranged in a rotationally fixed manner with respect to the measuring shaft 3. When the measuring shaft 3 rotates about its axis of rotation or pivot axis W as a result of a linear movement of an actuator rod, the measuring shaft-based angle sub-sensor 5*a* also performs a pivoting movement (e.g. the same pivoting movement) about the pivot axis W.

In an exemplary embodiment, the measuring shaft 3 is held and rotatably mounted relative to the housing 2 of the position sensor 1 via a sliding bearing 51. The first section 15 of the measuring shaft sectionally extends from the coupling portion 22 into the housing 2 through the sleeve bearing 51. The pivot lever 23 is coupled in a rotationally fixed manner to the end face of the first measuring shaft section 15, for example via a spline shaft connection. At the output 53 of the housing 2 on the actuator or lever-side, the first measuring shaft section protrudes out of the housing 2 of the position sensor 1. At the opening 53 of the housing 2, a seal 55 can be provided to seal the housing 2 relative to the measuring shaft 3.

If the lever 23 follows an up or down movement of the actuator rod of the actuator using the pin 24, the lever 23 rotates about the pivot axis W together with the pin 24 and drives the measuring shaft 3 into a corresponding rotational motion.

In an exemplary embodiment, to the base 16 of the first measuring shaft section 15, a rotationally fixed crown flange 10 is attached so that the latter follows each rotation of the first measuring shaft section 15. In an exemplary embodiment, the crown flange 10 has a substantially cylindrical or fully circumferential holding section in which a rotationally fixed connection to the base 16 of the first measuring shaft section 15 is provided on the inner side. The base 16 of the first measuring shaft section 15 can be connected to the crown flange 10 using a compression connection, an adhesive connection, a screw connection, or another connection as would be understood by one of ordinary skill in the art. In an exemplary embodiment, an elastic part, such as a pressure spring, is provided between the crown flange 10 and the housing so that a pressure force acts on the crown flange 10. The pressure force can be transferred into the first measuring shaft section 15 via the relationship thereto to anchor the first measuring shaft section 15 or entire the shaft 3 relative to the opening 53 of the housing 2 and to hold it in the axial direction A.

In the embodiment shown in FIGS. 1*a* and 1*c*, the crown flange 10 also includes diametrically opposite bar columns 11, 13, which extend in the axial direction A parallel to the pivot axis W through the circuit board 25. In an exemplary embodiment, the columns 11 and 13 are configured substantially mirror symmetrical relative to one another and include a hole or bore 12 or 14 parallel to the pivot axis approximately in the center of their cross-section. As can be more easily seen in FIG. 1*b*, the eccentric bar columns or bars 11, 13, are spaced at a radial distance R from the pivot axis W. The bars 11, 13 form a central section 8 of the measuring shaft 3, which connects together the two measuring shaft sections proximal to the actuator coupling (15) and distal from the coupling (17).

Between the opposite bars 11 and 13, a free diameter is thus provided corresponding to twice the radius R, enabling a substantially cylindrical minimum free space 21 to always be kept clear irrespective of the angular position of the measuring shaft 3, even in the event of a rotation of the measuring shaft 3 by, for example, 180° or 360°. Around the cylindrical minimum free space 21, a further directly adjacent space can be left free based on the shape of the bars 11, 13 and the shaft sections 15, 17. The free space 21, which extends in the radial direction between the two bars 11 and 13 and extends in the axial direction A between the first shaft section 15 and the second shaft section 17, is substantially cylindrical. In the free space 21, an angle sub-sensor 5*b* is arranged, rotationally fixed relative to a reference point or relative to the housing 2. The arrangement of the sub-sensors 5*a* and 5*b* can be reversed with the sub-sensor 5*a* being arranged rotationally fixed relative to the reference point and the sub-sensor 5*b* being rotationally fixed with respect to the measuring shaft 3.

As shown in FIG. 1*b*, the rotationally fixed mounting of the stationary angle sub-sensor 5*b* is arranged on a bridge 41 of the circuit board 25. The circuit board 25 can be fastened to the housing 2 using one or more fasteners, such as one or screws or other types of fasteners (e.g. glue, etc.). In an exemplary embodiment, the circuit board 25 is formed integrally with the material of the bridge 41. In an exemplary embodiment, the bridge 41 extends through the free space 21. For example, the bridge 41 can extend perpendicular to the axial direction A starting from a first foot 44 as far as an opposite second foot 45, which are both formed integrally as part of the circuit board 25. In an exemplary embodiment, the circuit board forms two sickle-shaped openings 31, 33, through each of which one respective eccentric bar 11 or 13 protrudes in the axial direction A. The cross-sectional width of the bars 11 and 13 and the size of the openings 31, 33 define the maximum pivot range and thus the maximum measuring range.

The two eccentric bars 11 and 13 may theoretically move about the pivot axis W towards the bridge 41 as far as a stop, either in a clockwise or counter clockwise direction through an angle α of approximately 60°. In an exemplary embodiment, the entire measuring range of the measuring shaft 3 in accordance with FIG. 1a to 1c is equal to twice the angle α, i.e. approximately 120°. In an exemplary embodiment, the distance measurable by the angle sensor 5 is the same size as or larger than the range of rotational free movement of the measuring shaft 3. In an exemplary embodiment, the stationary angle sub-sensor 5b is attached to the bridge 41 centrally on (intersected by) the pivot axis W of the measuring shaft 3. As part of a calibration of the position sensor 1, after the measuring shaft 3 is assembled and its rotary mounting is fixed relative to the housing 2 of the position sensor 1, it is possible to precisely position and align the stationary angle sub-sensor 5b.

FIG. 1c shows the central section of the measuring shaft 3 in more detail. In particular, as illustrated, the central section of the measuring shaft 3 protrudes through the circuit board 25. On the front-facing end of the crown flange, which realizes the eccentric bars 11 and 13, a base-side mounting flange 20 of the second shaft section 17 is attached in the manner of a flange, via mounting bolts 18, 19. Between the base-side flange 20 of the second shaft section 17, the two diametrically opposite eccentric bars 11 and 13 and the central part of the crown flange 10 seated at the end 16 of the first shaft section 15, the free space 21 is provided on the axis and surrounding the axis, in which the entire angle sensor 5 is arranged. As described above, a bridge 41 of the circuit board 25, which is fixed to the housing, protrudes perpendicularly through the measuring shaft 3 between the eccentric bars 11 and 13 in a spoke-like configuration and supports the stationary angle sub-sensor 5b at the level of the pivot axis W. In the axial direction A opposite to the stationary angle sensor 5b, a measuring shaft-based angle sensor 5a is attached to the base end of the second measuring shaft section 17. The measuring shaft-based angle sub-sensor 5a is arranged close to the axis W. The measuring shaft-based angle sub-sensor 5a is arranged on a section of the measuring shaft 3, which in relation to the lever 23 is arranged on the rearward side relative to the circuit board 25 with respect to the front side 57 of the housing. The measuring shaft 3 passes through openings 31, 33 in the circuit board 25. These arrangements of the sub-sensors 5a and 5b is not limited and the arrangement of the sub-sensors can be reversed.

The first measuring shaft section 15 is arranged on the forward side between the circuit board 25 and the coupling 22 to the lever 23, and the second measuring shaft section 17 is arranged on the rearward side of the circuit board 25 relative thereto. At the end of the second measuring shaft section 17 on the base side, the measuring shaft-based angle sub-sensor 5a is arranged such that it points in the direction of the front-facing end 16 of the first measuring shaft section 5.

In an exemplary embodiment, the stationary angle sub-sensor 5b is arranged on the side of the circuit board 25 that is oriented towards the measuring shaft-based angle sub-sensor 5a to minimize the axial distance between the sub-sensors 5a and 5b of the angle sensor 5 and to allow for easy measurements.

Due to the assembly of the flange base 20 of the second measuring shaft section 17, the tolerances of the first measuring shaft section, for example as a result of the bearing 51 or as a result of production inaccuracies, can be compensated for in such a way that the second measuring shaft section 17 is positioned as exactly concentrically and coaxially as possible with respect to the axis of rotation W. With respect to the rotational axis W of the measuring shaft 3 a calibrating, coaxial alignment of the measuring shaft-based angle sub-sensor 5a can (alternatively or additionally) be effected with high precision. The position sensor 1 according to the present disclosure in the embodiment shown in FIGS. 1a to 1c therefore allows a particularly precise assembly of the two angle sub-sensors 5a and 5b (of the sensor 5) relative to the pivot axis W and relative to one another, enabling a very high angular measurement accuracy to be achieved. In an exemplary embodiment, the angle sub-sensors 5a and/or 5b include processor circuitry that is configured to perform one or more functions of the respective angle sub-sensor 5a, 5b.

The multi-part design of the measuring shaft with a first measuring shaft section 15, a second measuring shaft section 17, and a third measuring shaft section 8 provided therebetween which are attached to one another, allows a particularly compact design of a position sensor 1 together with an improved facility for aligning the angle sub-sensors 5a and 5b relative to one another.

With regard to the part which supplies the torque, i.e. the lever 23, at the remote end of the second measuring shaft section 17, two different measuring shaft-based position sub-detectors 7a, 9a are arranged that act and are adjustable independently of one another, in the form of switching flags 7a, 9a. In this example, the position detector 7, 9 can include one or more measuring shaft-based position sub-detectors 7a, 9a and one or more respective housing-based position sub-detectors 7b, 9b. The arrangement of the sub-detectors 7a, 9a, 7b, 9b are not limited and the sub-detectors 7a, 9a can be housing based while the sub-detectors 7b, 9b are measuring shaft based.

In an exemplary embodiment, the front-facing end of the second measuring shaft section 17 has at least one non-round (can) section or wedge-shaped section for the stationary arrangement of the supports 71, 91 of the switching flags 7a and 9a. The switching flags 7a, 9a can be arranged via releasably attachable adjusting rings 73, 93 such that in the detached state they can be rotated relative to the second measuring shaft section 17 or the measuring shaft 3. In the embodiment shown in FIG. 1c, a fastening for holding the adjusting rings 73, 93 in a rotationally fixed manner relative to the measuring shaft 3 is implemented by the mounting bolt 97, which produces a force-fitting, fixed connection of the adjusting rings 73, 93, each of which carries one of the measuring flags 7a, 9a. The locking screw 97 can be loosened to allow a rotation of the adjusting rings 73 and 93 relative to the measuring shaft 3. In this way, the measuring flags 7a and 9a (or any other measuring shaft-based position sub-detectors) can be moved into a predetermined angular position, in particular one that corresponds to a critical angular position of the measuring shaft 3 or to a critical position of an actuating rod of the actuator, which is kinematically connected to the measuring shaft 3. In this way, a simple adaptation of a position sensor 1 to different actuators can be implemented. If the locking bolt 97 is fully tightened, it holds the adjusting rings 73, 93 mounted on the position detector supports 71 and 91 in a fixed position on the measuring shaft, i.e. rotationally fixed, with respect to the measuring shaft 3.

Each of the measuring shaft-based position sub-detector 7*a* or 9*a*, which in the present example are implemented as position detector flags, interact with a respective housing-based position sub-detector 7*b* or 9*b* which is attached to the housing 2 in a stationary manner to form a reference. In an exemplary embodiment, each stationary position sub-detector 7*b* or 9*b* is configured to detect whether the respective measuring flag 7*a* or 9*a* assigned thereto reaches a predetermined actual angular position. For example, a stationary position sub-detector 9*b* can include an electrical, electromagnetic, optical or mechanical switch, which is activated by the switch flag 9*a* when the switch flag 9*a* reaches a certain actual angular position, in order to generate a signal of a position sensor 1 or a position controller electronics which signals that the measuring shaft 3, or an actuator rod or actuator shaft kinematically connected to the measuring shaft 3, has reached a certain position. This can be, for example, a fully open or fully closed end position of the actuator rod or the actuator shaft particularly with a valve member attached thereto. In an exemplary embodiment, one or more of the position sub-detectors 7*a*, 9*a*, 7*b*, 9*b* includes processor circuitry that is configured to perform one or more respective functions and/or operations of the position sub-detector(s).

For example, one of the position detectors, for example the lower position detector 7, can signal reaching a lower, fully closed valve position. The upper position detector 9 can be designed, for example, to detect and signal an open, in particular fully open, valve position. As long as the actuating rod is located in the range between the predefined positions that the position detectors 7, 9 are configured to detect, then the position detectors 7 or 9 will only detect that neither of the predefined angular positions has been reached. The position detectors 7 and 9 are preferably of such a form that they cannot measure an actual angular position, but can only detect a single predefined angular position. Simple sensors of this kind have proven to be particularly well suited for safety-critical applications, because their simplicity means they are less error-prone.

Figures 2A, 2B:
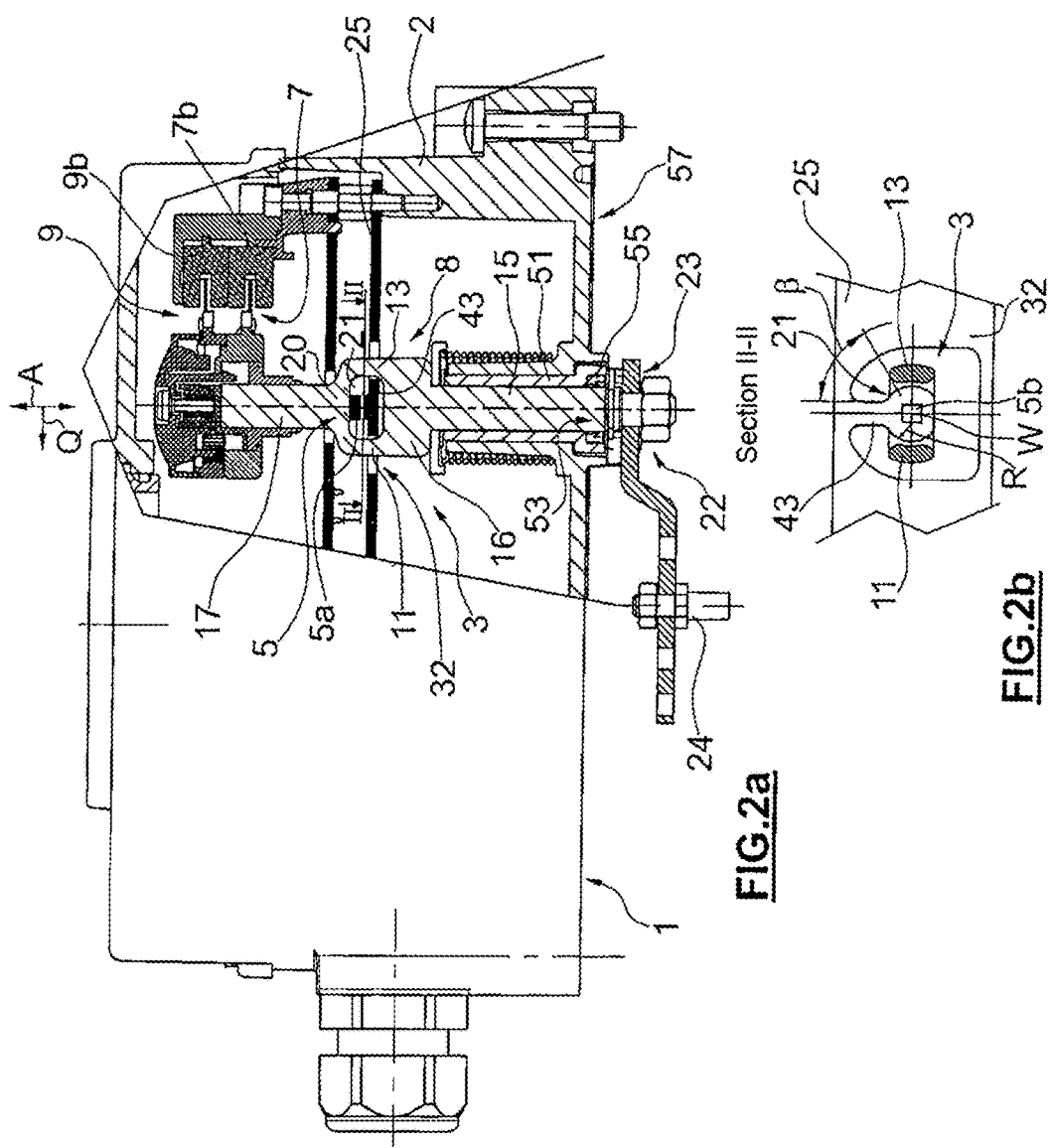
FIG. 2a shows a position sensor with an integral measuring shaft body according to an exemplary embodiment of the present disclosure.
FIG. 2b shows a partial cross-sectional view of the position sensor of FIG. 2a along the section line II-II.

FIGS. 2*a* and 2*b* show another exemplary embodiment of a position sensor 1, which is similarly configured as the position sensor described above in relation to FIGS. 1*a* to 1*c*, with common or similar components being referred to with the same reference numerals. In regard to the described functions of the position sensor 1, in particular of the angle sensor 5 and the position detector 7, 9, including their arrangement relative to the measuring shaft 3, reference is therefore made to the above discussion. The same applies to the arrangement of the measuring shaft 3 relative to the housing, and the kinematic coupling to an actuator rod.

In contrast to the position sensor described previously, the measuring shaft 3 protruding through the circuit board 25 is formed with an integral measuring shaft body. A single material part, which can be, for example, cast, milled and/or turned, integrally implements both the first measuring shaft section 15, the second measuring shaft section 8, which is sub-divided into individual eccentric bars 11, 13 and protrudes through an opening 32 of the circuit board 25, and also implements the second measuring shaft section 17, which is arranged behind the circuit board 25 with respect to the front face 57 of the housing and carries the measuring shaft-based angle sub-sensor 5*a* and the measuring shaft-based position sub-detector 7*a*, 9*a*. An integral measuring shaft 3 offers the advantages of maximally accurate manufacture, for example by turning, in such a way that the first section 15 of the measuring shaft and the second section 17 of the measuring shaft can satisfy particularly high precision requirements in terms of their coaxiality and concentricity.

In an exemplary embodiment, the central part 8 or the central section is formed by a fork in the integral measuring shaft 3, so that a free space 21 remains in the axial, central area, which can be applied radially through the measuring shaft, for example by means of a milling operation.

In an exemplary embodiment, it is also conceivable that, instead of two eccentric bars 11 and 13, a measuring shaft 3 has only a single eccentric bar (not shown), which projects eccentrically in a cam-like manner relative to the first measuring shaft section 15 and the second measuring shaft section 17, and moves about the pivot axis W eccentrically around the free space 21, which extends in the axial direction A between the front end 16 of the first measuring shaft section 15 and the base end 20 of the second measuring shaft section 17. The angle sensor 5 is arranged completely in the free space 21.

As is illustrated in the sectional view in FIG. 2*b*, the stationary angle sub-sensor 5*b* is arranged on a peninsula-like tongue section 43 of the circuit board 25. The opening 32 of the circuit board 25 is U-shaped and dimensioned in such a way that the integral measuring shaft 3 can be inserted through the opening 32 of the circuit board 25 in the axial direction for mounting. In the embodiment shown, two eccentric bars 11, 13 can rotate by an angle β of no greater than approximately 60°, until one of the bars 11 or 13 strikes the tongue 43. The entire measurement range here also is roughly twice the angle β and thus approximately 120°. The possible measuring angle (in both measurement shaft designs) is increased by a U-shaped opening 32 being formed, which extends as far as possible in the circumferential direction, in other words over at least 180°, over at least 270° or even over at least 330° relative to the pivot axis W. At the same time, the maximum measuring range can be increased by reducing the number of eccentric bars or by minimizing the extension of the eccentric bar or bars in the circumferential direction. For example, in the U-shaped hole 32 of the circuit board 25 of a measuring shaft 3 shown in FIG. 2*b*, which has only one eccentric bar (for example, the bar 11), a maximum rotation range could be provided which is obtained by a movement of the bar 11 in a clockwise or counter-clockwise direction from a counter clockwise-facing end stop on the tongue bar 43 up to the opposite clockwise-facing end stop on the tongue 43, and which is greater than 35°, preferably greater than 180°.

In embodiments illustrated in FIG. 1*b* or 2*b*, the width of the opening 31, 32 or 33 in the radial direction Q perpendicular to the pivot axis W is necessarily greater than the radial width of the bars 11, 13, so that these can freely rotate in the opening up to the theoretical end stop on the tongue 43 or the bridge 41. The opening in the radial direction Q can be much larger than the bars 11, 13, to simplify the installation of the shaft. In the embodiments shown in FIGS. 1*a* to 1*c*, the bars can be, for example, approximately 0.3 cm to 0.7 cm, and more particularly around 0.5 cm wide in the radial direction. With an integral construction of a measuring shaft 3, as shown in FIGS. 2*a* and 2*b*, due to the fact that no bore 12, 14 has to be provided, the radial width of the bars 11, 13 can be designed thin, preferably with a radial width between approximately 1 mm and 5 mm, in particular approximately 3 mm. In an exemplary embodiment, in the circumferential direction, the bars 11, 13 can be, for example, 0.5 cm to 1.5 cm thick, and more particularly approximately 1 cm. In this example, a sufficient thickness of material is provided so as to provide sufficient rigidity for a high measuring accuracy, while the width in the circumferential direction can be kept as small as possible to not unnecessarily reduce the measuring range.

In an exemplary embodiment, the free space 21 is at least 5 mm in diameter to be able to receive the stationary angle sub-sensor 5b and/or the measuring shaft-based angle sub-sensor 5a. In an exemplary embodiment, the free space is greater than 8 mm in diameter and/or less than 2 cm in diameter.

The features disclosed in the present description, the claims and the drawings can be of significance both individually and also in any desired combination for the implementation of the present disclosure in its various embodiments.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 Position sensor
2 Housing
3 Measuring shaft
5 Angle sensor
5a, 5b Angle sub-sensor (e.g. component of the sensor 5)
7, 9 Position detector
7a, 7b, 9a, 9b Position sub-detector (e.g. component of the detector 7, 9)
8 Central measuring shaft section
10 Crown flange
11, 13 Bar
12, 14 Bore
15 first measuring shaft section
16 End face
17 second measuring shaft section
18, 19 Mounting bolt
20 Mounting flange
21 Free space
22 Coupling
23 Lever
24 Pin
25 Circuit board
31, 32, 33 Opening
41 Bridge
43 Tongue
44, 45 Bridge foot
51 Sliding bearing
53 Housing opening
55 Seal
57 front side of housing 71, 91 Support
73, 93 Actuating ring
97 Mounting bolt
A Axial direction
R Radial distance
W Axis of rotation

What is claimed is:

1. A position sensor for an actuator, comprising:
a measuring shaft configured to pivot less than 360° around a pivot axis; and
an angle sensor configured to detect an angular position of the measuring shaft relative to a stationary reference point, the angle sensor including a measuring shaft-based angle sub-sensor,
wherein the measuring shaft includes:
a first section of the measuring shaft configured to introduce a pivotal movement to the measuring shaft corresponding to a control movement of an actuator rod,
a second section of the measuring shaft, the measuring shaft-based angle sub-sensor being attached thereto, and
at least one bar extending eccentrically relative to the pivot axis in an axial direction and arranged between the first section of the measuring shaft and the second section of the measuring shaft in the axial direction to connect and rotationally fix the first and the second sections of the measuring shaft, and
wherein a free space is arranged between the first and the second sections of the measuring shaft in the axial direction and at a level of the pivot axis in a radial direction, the angle sensor being arranged at least partially in the free space, and the at least one eccentric bar enabling access to the free space in the radial direction transverse relative to the axial direction.

2. The position sensor according to claim 1, wherein the angle sensor further comprises:
a sensor carrier; and
a stationary angle sub-sensor attached to the sensor carrier and being stationary relative to a housing of the position sensor, wherein the sensor carrier extends transverse to the pivot axis and protrudes into the free space in the radial direction, and/or includes at least one opening through which the at least one eccentric bar protrudes.

3. The position sensor according to claim 2, wherein the at least one opening is sickle-shaped or U-shaped.

4. The position sensor according to claim 2, wherein the sensor carrier comprises:
a bridge or tongue that is at least partially confined by the at least one opening,
wherein the bridge or tongue is configured to support the stationary angle sub-sensor.

5. The position sensor according to claim 4, wherein the stationary angle sub-sensor is arranged on the pivot axis of the measuring shaft.

6. The position sensor according to claim 1, wherein a measuring range of the angle sensor is:
(1) at least 30°; and/or
(2) less than 360°.

7. The position sensor according to claim 1, further comprising:
a position detector having a measuring shaft-based position detector arranged at the measuring shaft, and configured to detect whether the angular position of the measuring shaft corresponds to a predetermined angular position.

8. The position sensor according to claim 7, wherein the measuring shaft-based position detector is arranged at the second coaxial section of the measuring shaft.

9. The position sensor according to claim 1, wherein the first coaxial section of the measuring shaft and the eccentric bar are integrally formed, or in that the first coaxial section of the measuring shaft, the second coaxial section of the measuring shaft, and/or the at least one eccentric bar are formed by several detachably connected components.

10. The position sensor according to claim 9, wherein the second section of the measuring shaft is further integrally formed with the first coaxial section of the measuring shaft and the eccentric bar.

11. The position sensor according to claim 1, wherein two or more of the first coaxial section of the measuring shaft, the second coaxial section of the measuring shaft, and the at least one eccentric bar are detachably connected together.

12. The position sensor according to claim 1, wherein the measuring shaft-based angle sub-sensor component includes a permanent magnet.

13. The position sensor according to claim 1, wherein the first and the second sections of the measuring shaft extend coaxially to the pivot axis.

14. A position sensor, comprising:
a measuring shaft configured to pivot less than 360° around a pivot axis;
an angle sensor configured to detect an angular position of the measuring shaft relative to a reference point, wherein the angle sensor includes:
a rotationally fixed angle sub-sensor and being rotationally fixed relative to the measuring shaft, and
a stationary angle sub-sensor that is positioned stationary relative to the reference point; and
a position detector configured to detect whether the angular position of the measuring shaft corresponds to a predetermined angular position, the position detector including:
a rotationally fixed position sub-detector rotationally fixed relative to the measuring shaft, and
a stationary position sub-detector arranged stationary relative to the reference point.

15. The position sensor according to claim 14, wherein the rotationally fixed position detector is a switch flag and the stationary position detector is a switch.

16. The position sensor according to claim 14, wherein the measuring shaft comprises:
a first section of the measuring shaft extending coaxially to the pivot axis in an axial direction, and
at least one bar connected to the first section of the measuring shaft and extending eccentrically to the pivot axis in axial direction,
wherein the measuring shaft provides a cylindrical free space configured to at least partially house the angle sensor at a level of the at least one bar in the axial direction and at a level of the pivot axis in a radial direction.

17. The position sensor according to claim 14, wherein the first section of the measuring shaft comprises:
a coupling section configured to initiate a pivotal movement around the pivot axis of the measuring shaft corresponding to a control movement of an actuator bar of the actuator,
wherein the rotationally fixed angle sub-sensor is arranged between the coupling section and the at least one position indicator in axial direction.

18. The position sensor according to claim 14, wherein the angle sensor is arranged on the rotation axis of the measuring shaft and connected to a housing of the position sensor.

19. An actuator configured to control a process fluid flow of a processing plant according to claim 1, wherein the position sensor is configured such that the measuring shaft performs a pivotal movement corresponding to a control movement of an actuator bar of the actuator.

20. The actuator according to claim 19, wherein the position sensor comprises a position detector configured to detect a predetermined angular position of the measuring shaft corresponding to an end position of the actuator bar.

* * * * *